US005990879A

United States Patent [19]

Mince

[11] Patent Number: 5,990,879

[45] Date of Patent: Nov. 23, 1999

[54] METHOD AND APPARATUS FOR DYNAMICALLY ARRANGING INFORMATION IN A PRESENTATION SEQUENCE TO MINIMIZE INFORMATION LOSS

[75] Inventor: William L. Mince, Menlo Park, Calif.

[73] Assignee: Qorvis Media Group, Inc., San Francisco, Calif.

[21] Appl. No.: 08/771,605

[22] Filed: Dec. 20, 1996

[51] Int. Cl.[6] .......................... G06F 13/38; G06F 13/00; G09B 15/02; H04N 9/42

[52] U.S. Cl. .......................... 345/302; 395/306; 395/287; 84/601; 348/23

[58] Field of Search .................................... 345/302, 435, 345/115; 348/7, 23, 41; 395/704, 306, 287; 707/3, 101, 104, 500, 513, 530; 364/133, 140.06, 193, 191; 84/601; 709/201, 203, 253

[56] References Cited

U.S. PATENT DOCUMENTS

| | | | |
|---|---|---|---|
| 4,092,732 | 5/1978 | Ouchi | 364/900 |
| 4,262,302 | 4/1981 | Sexton | 358/10 |
| 4,782,401 | 11/1988 | Faerber et al. . | |
| 4,937,807 | 6/1990 | Weitz et al. . | |
| 5,084,768 | 1/1992 | Stern et al. . | |
| 5,237,157 | 8/1993 | Kaplan . | |
| 5,526,482 | 6/1996 | Stallmo et al. . | |
| 5,583,561 | 12/1996 | Baker et al. | 348/7 |
| 5,634,022 | 5/1997 | Crouse et al. | 395/704 |
| 5,642,171 | 6/1997 | Baumgartner et al. | 348/515 |
| 5,764,901 | 6/1998 | Skarbo et al. | 395/200.34 |
| 5,784,527 | 7/1998 | Ort | 386/111 |

FOREIGN PATENT DOCUMENTS

| | | |
|---|---|---|
| 95/01703 | 1/1995 | WIPO . |
| 95/17794 | 6/1995 | WIPO . |

*Primary Examiner*—Joseph H. Feild
*Assistant Examiner*—Alford W. Kindred
*Attorney, Agent, or Firm*—Townsend and Townsend and Crew LLP

[57] ABSTRACT

A method for transmitting a predetermined sequence of data files on a data bus is described. The data files are stored on a plurality of memory drives. Each of a first type of data file is stored on only one of the memory drives. Each of a second type of data file is stored on at least two of the memory drives. Upon encountering a first data file of the first type in the predetermined sequence, it is determined whether the corresponding memory drive is available. Where the corresponding memory drive is available, the first data file is transmitted on the data bus. Where the corresponding memory drive is not available, first data corresponding to the first data file is written to a temporary data file. The first data file is then transmitted on the data bus after the corresponding memory drive becomes available. Upon encountering a second data file of the second type in the predetermined sequence, the second data file is transmitted on the data bus.

28 Claims, 6 Drawing Sheets

302

VIDEO SCRIPT

| # | FILE TYPE |
|---|---|
| 1 | Program |
| 2 | Program |
| 3 | Program |
| 4 | Commercial |
| 5 | Commercial |
| 6 | Program |
| 7 | Program |
| 8 | Program |
| 9 | Commercial |
| 10 | Announcement |
| 11 | Commercial |
| 12 | Program |
| 13 | Program |
| 14 | Program |
| 15 | Commercial |
| 16 | Commercial |
| 17 | Program |
| 18 | Program |
| 19 | Program |
| 20 | Commercial |
| 21 | Commercial |
| 22 | Program |
| 23 | Program |
| 24 | Program |
| 25 | Commercial |
| | **return to top** |

sub-files

308

VIDEO PROGRAMS

| FILENAME | D |
|---|---|
| vp001.mpg | C |
| vp002.mpg | D |
| vp003.mpg | E |
| vp004.mpg | C |
| vp005.mpg | D |
| vp006.mpg | E |
| vp007.mpg | C |
| vp008.mpg | D |
| vp009.mpg | E |
| vp010.mpg | C |
| vp011.mpg | D |
| vp012.mpg | E |
| vp013.mpg | C |
| vp014.mpg | D |
| vp015.mpg | E |
| vp016.mpg | C |
| vp017.mpg | D |
| vp018.mpg | E |
| vp019.mpg | C |
| vp020.mpg | D |
| **return to top** | |

314

VIDEO COMMERCIALS

| FILENAME | D1 | D2 |
|---|---|---|
| vc001.mpg | C | D |
| vc002.mpg | D | E |
| vc003.mpg | E | C |
| vc004.mpg | C | D |
| vc001.mpg | D | E |
| vc005.mpg | E | C |
| vc002.mpg | C | D |
| vc006.mpg | D | E |
| vc001.mpg | E | C |
| vc007.mpg | C | D |
| vc008.mpg | D | E |
| vc009.mpg | E | C |
| **return to top** | | |

316

VIDEO ANNOUNCEMENTS

| FILENAME | D1 | D2 |
|---|---|---|
| va001.mpg | C | D |
| va002.mpg | D | E |
| **return to top** | | |

310

VIDEO TEMP

| FILENAME | D |
|---|---|
| vp010.mpg | C |
| vp015.mpg | E |

FIG. 3A sub-files

304

| AUDIO SCRIPT | |
|---|---|
| # | FILE TYPE |
| 1 | Program |
| 2 | Program |
| 3 | Program |
| 4 | Program |
| 5 | Commercial |
| 6 | Program |
| 7 | Program |
| 8 | Program |
| 9 | Program |
| 10 | Commercial |
| 11 | Announcement |
| 12 | **return to top** |

306

| AUDIO PROGRAMS | |
|---|---|
| FILENAME | D |
| ap001.wav | D |
| ap002.wav | E |
| ap003.wav | C |
| ap004.wav | D |
| ap005.wav | E |
| ap006.wav | C |
| ap007.wav | D |
| ap008.wav | E |
| ap009.wav | C |
| ap010.wav | D |
| ap011.wav | E |
| ap012.wav | C |
| ap013.wav | D |
| ap014.wav | E |
| ap015.wav | C |
| ap016.wav | D |
| ap017.wav | E |
| ap018.wav | C |
| ap019.wav | D |
| ap020.wav | E |
| **return to top** | |

318

| AUDIO COMMERCIALS | | |
|---|---|---|
| FILENAME | D1 | D2 |
| ac001.wav | C | D |
| ac002.wav | D | E |
| ac003.wav | E | C |
| ac001.wav | C | D |
| ac004.wav | D | E |
| ac005.wav | E | C |
| ac006.wav | C | D |
| **return to top** | | |

320

| AUDIO ANNOUNCEMENTS | | |
|---|---|---|
| FILENAME | D1 | D2 |

312

| AUDIO TEMP | |
|---|---|
| FILENAME | D |
| ap008.wav | E |

FIG. 3B

METHOD AND APPARATUS FOR DYNAMICALLY ARRANGING INFORMATION IN A PRESENTATION SEQUENCE TO MINIMIZE INFORMATION LOSS

BACKGROUND OF THE INVENTION

The present invention relates to the playback of audio and video data. More specifically, the present invention provides a means by which audio and video data may simultaneously be presented in a retail environment using a single, inexpensive hardware platform such as, for example, a personal computer (FC) or its equivalent.

Currently, retail locations employ both audio and video presentations for a variety of purposes. For example, such presentations are employed to promote specific products, e.g., televisions, or to provide in-store advertising. Audio and video presentations may also be used to provide a particular ambience. In the typical case, the majority of the content presented in this manner to consumers comprises either entertainment content or commercial content such as, for example, so-called "infomercials".

A variety of techniques are currently employed to effect playback of these audio and video presentations. Some systems employ conventional audio/video tape decks or laser disk players. In other systems, programming content is directly broadcast to the retail location via satellite. In the former case, more than one tape or disk player is necessary if, as is often the case, more than one stream of audio and/or video data is to be presented. Moreover, the audio and video content itself is fixed in some medium, e.g., a video tape cassette or a laser disk, which necessitates interruption of the presentation flow when changes to the content are desired. In the latter case, the audio and video content may easily be changed on-the-fly by altering the data transmitted from the satellite. However, such a system is prohibitively expensive for the majority of retail concerns.

One currently available method for simultaneously presenting more than one stream of data is accomplished through the use of redundant and inexpensive drive (RAID) technology. RAID technology is employed by file servers in the context of local area networks (LANs) to enable several inexpensive hard drives to emulate a single large storage device in which multiple user may have simultaneous access to the same information. However, not only will the cost of such a system still be prohibitive for a significant number of retail concerns, it also represents an inefficient solution in that it provides far more computing "muscle" than is typically necessary for the intended application.

It is therefore apparent that there exists a need for an inexpensive audio and video playback system for retail locations which is capable of simultaneously presenting more than one stream of audio and video data while also providing the capability of altering the audio and video content without disrupting the presentation flow.

SUMMARY OF THE INVENTION

The present invention provides a system which can play both audio and video from the same personal computer (PC) without the use of RAID technology. The hardware and software of the present invention emulates RAID technology without the high cost of a RAID controller and SCSI drives. The distribution of playback scripts and new audio/video content is not dependent on any specific transmission method such as satellite, T1, or frame relay, or any particular transmission medium such as the Internet. Rather, it will be understood that any combination of these and other methods and mediums may be used. The playback system of the present invention requires only a connection to a LAN server with a dedicated home directory. Playback is implemented using standard PC multimedia audio and video hardware. Text and graphic overlay files are associated with video files and incorporated into the VGA layer during playback. This makes it possible for a store manager, brand manager or corporate headquarters to supply new audio and video content, scripts, text or graphics on a local, regional, or national basis. That is, not only may new audio and video files be loaded onto the PC's hard drives, associated text and graphic overlay files may be altered and/or added using standard application software resident on the local PC or, for that matter, any of the PCs on or having access to the LAN.

The present invention provides a hardware configuration which employs separate sound and video circuitry for content playback, and takes advantage of the multiprocessing capability of a PC using, for example, the Windows95 or NT operating systems. The video data transmission rate is carefully controlled to avoid any audio or video data "drop-out" due to exceeding the system's processing capabilities. That is, the video data transfer rate is restricted to one which allows for the audio and video to be played simultaneously. According to a specific embodiment, a RealMagic Ultras) card from Sigma Designs is employed with a video data transfer rate of 260 kilobytes per second or less. Of course, other video playback boards will have different limits depending upon their processing capabilities. According to a more specific embodiment, the system of the present invention provides "radio quality" audio, i.e., 22,050 Hz, 8-bit mono. It will be understood that other levels of audio quality, e.g., "CD quality" may be provided by further restricting the video data transfer rate.

In addition, the system has a plurality of shared hard drives across which the audio and video files are substantially evenly distributed. This drive redundancy allows new audio and video content, scripts, text and graphics to be transferred to one of the drives for playback without interrupting audio and video currently being presented from another one of the drives.

According to a specific embodiment, the audio associated with video playback is provided through the PC's NTSC output as well as discreetly placed multimedia speakers to provide an appropriate ambient sound level. With this configuration, the consumer can raise the volume of an individual television in a showroom without significantly affecting the overall ambient noise level. Similarly, when the volume of an individual television is reduced, there is still adequate ambient volume for the promotion of ads and entertainment. This addresses the noise pollution issue which often causes store personnel to turn off currently available systems.

Thus, the present invention provides a method for transmitting a predetermined sequence of data files on a data bus. The data files are stored on a plurality of memory drives. Each of a first type of data file is stored on only one of the memory drives. Each of a second type of data file is stored on at least two of the memory drives. Upon encountering a first. data file of the first type in the predetermined sequence, it is determined whether the corresponding memory drive is available. Where the corresponding memory drive is available, the first data file is transmitted on the data bus. Where the corresponding memory drive is not available, first data corresponding to the first data file is written to a temporary data file. The first data file is then transmitted on the data bus after the corresponding memory drive becomes available. Upon encountering a second data file of the second type in the predetermined sequence, the second data file is transmitted on the data bus.

According to another embodiment of the invention, a method is provided for substantially simultaneously presenting audio and video presentations using a single hardware platform. Video data are transmitted from the video data files corresponding to the video presentations to video circuitry within the hardware platform at a first data rate. Audio data are transmitted from the audio data files corresponding to the audio presentations to audio circuitry within the hardware platform at a second data rate. An audio speaker is driven with the audio circuitry according to the audio data thereby presenting the audio presentations over the audio speaker. Substantially simultaneous with this, a television monitor is driven with the video circuitry according to the video data thereby presenting the video presentations on the television monitor. The first and second data rates are controlled by a single processor to ensure that substantially all of the video and audio data are employed.

According to still another embodiment, a method for performing diagnostic testing is provided. A series of hardware diagnostic checks are performed on the hardware platform. A log file is created which keeps track of any hardware problems. Where operation of a first one of the memory drives has degraded, the data files corresponding to that memory drive are manipulated to maintain at least a portion of the playback sequence.

A further understanding of the nature and advantages of the present invention may be realized by reference to the remaining portions of the specification and the drawings.

BRIEF DESCRIPTION OF THE DRAWINGS

FIG. 3 is an illustration of file data for a specific cycle of programming according to a specific embodiment of the invention;

DESCRIPTION OF SPECIFIC EMBODIMENTS

Figure 1:
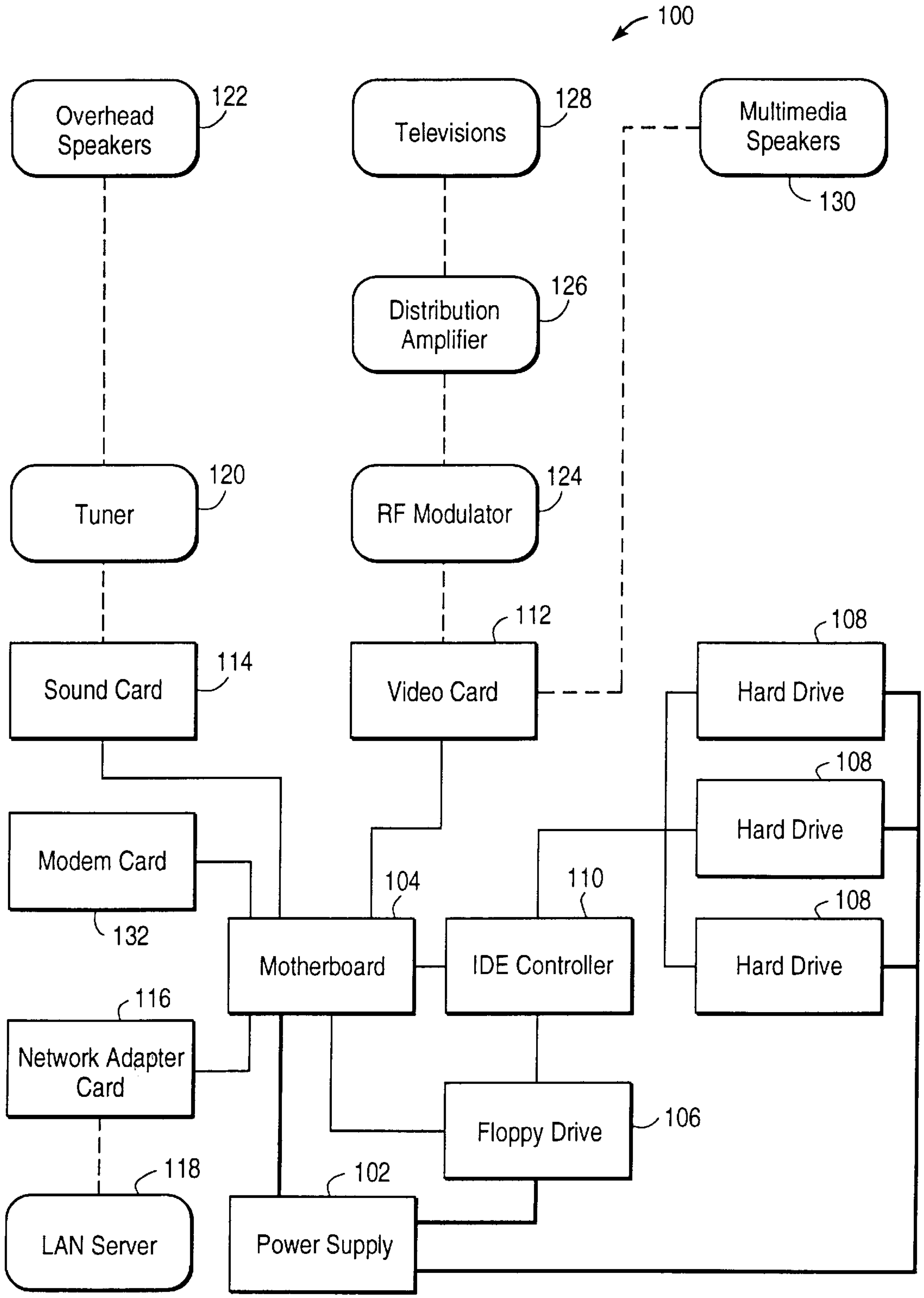
FIG. 1 is a block diagram of a specific embodiment of the invention.

FIG. 1 is a block diagram showing a hardware configuration of a specific embodiment of the invention. The bold rectangles represent the main components of the system assembled into a standard PC case or mini-tower. The rectangles with rounded corners represent peripheral components of the system which are connected to the PC case by cables and connectors. The bold solid line shows the electrical connection of the components to the power supply. The other solid line represents the flow of data between the components. The dotted lines represent the flow of data to the external peripheral components.

Audio/video playback system 100 includes a PC motherboard 104 which controls a floppy drive 106, an IDE controller board 110, a video card 112, a sound card 114 and a network adapter card 116. IDE controller board 110 directs the flow of audio and video files from three hard drives 108. Sound card 114, which may be any of a variety of commercially available PC-compatible sound cards (e.g., the Sound-Blaster® card available from Creative Technologies, Inc.), sends the audio to tuner 120. Alternatively, the audio output function may be included as a chip set on motherboard 104. Tuner 120 distributes the audio of the retail location's public address speaker system. Video card 112, which may be any of a variety of commercially-available PC-compatible video cards (e.g. the RealMagic Ultra® card from Sigma Designs), sends the video/audio to RF modulator 124. Alternatively, the video/audio output function may be included as a chip set on motherboard 104. RF Modulator 124 converts the signal from a standard NTSC format to a cable TV format. In this embodiment MPEG 1 video files are shown. However, it will be understood that any PC-compatible video format may be used. RF modulator 124 sends the video/audio to distribution amplifier 126 which distributes the video/audio to the appropriate televisions. Video card 112 also sends the audio associated with the video to multimedia speakers 130. A LAN server 118 is connected to the system via adapter card 116 and has at least one dedicated directory corresponding to system 100 for storing the audio and video data files to be presented. The system also includes a modem card 132 for remote dial up such as that required during a diagnostic session as described above.

Figure 2:
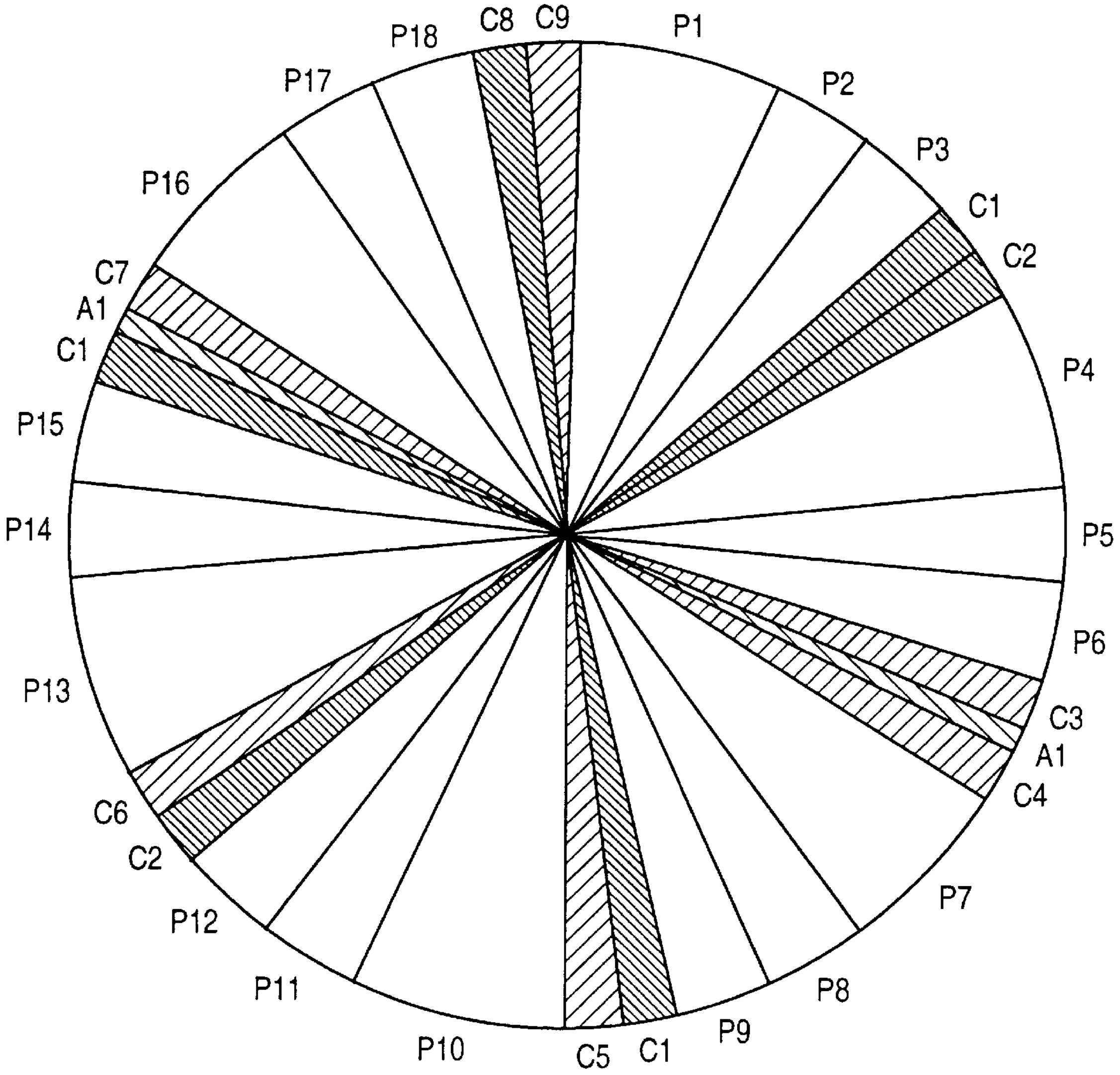
FIG. 2 is a pie chart showing a playback sequence of one hour of audio or video programming according to a specific embodiment of the invention.

FIG. 2 is a pie chart showing a playback sequence of one hour of audio or video programming according to a specific embodiment of the invention. An audio or video script file determines the sequence of file types to be played. Segments $P_n$ are program elements of the script. Segments $C_n$ are commercial elements of the script. Segments $A_n$ are announcement elements of the script. The frequency with which each element is played back is a function of the corresponding script files. It will be understood that there are separate playback sequences for each stream of audio or video data.

FIG. 3 is an illustration of the data files associated with a particular embodiment of the invention and the data included in specific scripts for playback. Video script file 302 and audio script file 304 list the file types to be played. The system software proceeds down each list until a "return to top" indicator is encountered. The sequence is then repeated. The program files are distributed evenly among the system's three hard drives. The drive location for each file is listed either in audio program file 306 or video program file 308. Temporary files 310 and 312 are available for the system software to track files which need to be played out of sequence because the drive on which a particular file is stored was in use when the file was initially called. It will be understood that the file and data types shown are for illustration purposes and do not limit the present invention to any specific file structure or data format. The commercials and announcements of files 314, 316, 318, and 320 ($C_n$ and $A_n$ in FIG. 2) are each stored on at least two of the system's hard drives for redundancy. The commercial and announcement files designate the primary location of each file along with its secondary drive location. In this way, regardless of which drive is in use at any given time, the commercial and announcement files are assured of being retrieved and inserted into the presentation flow.

Figure 4:
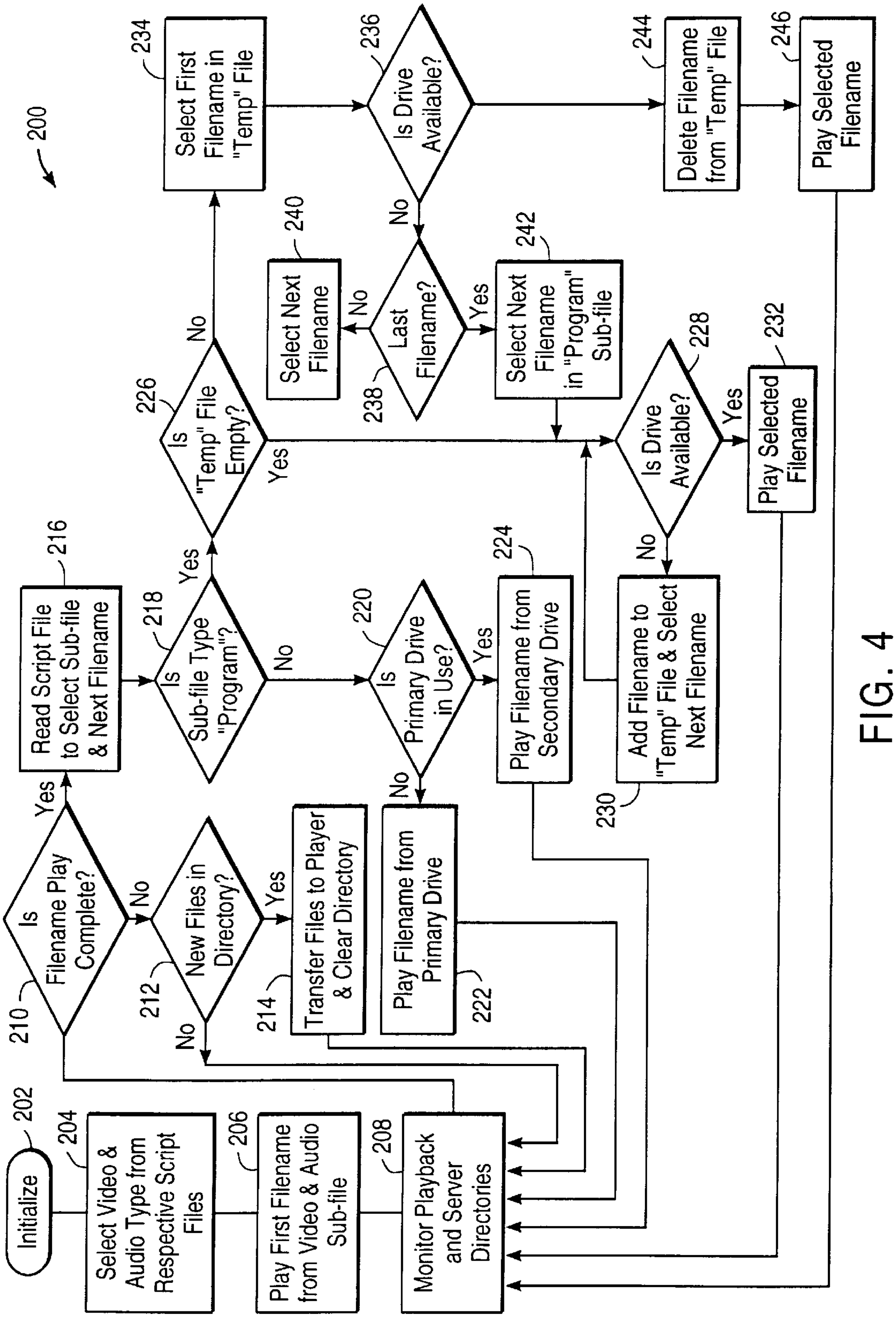
FIG. 4 is a flowchart describing operation of a specific embodiment of the invention.

FIG. 4 is flowchart describing operation of a specific embodiment of the invention. As system operation begins, the software is initialized (step 202). During initialization the temporary files on player PC are cleared. The system then selects the first video and audio file type from the script files (step 204). The first filename is played from the appropriate sub-file (step 206). Throughout its operation, the system monitors the video and audio playback along with the designated directories on the LAN server (step 208). If an audio or video playback is not complete (step 210), the system checks to see if there are new files in the directories on the LAN server (step 212). If not, the system returns to the monitoring mode (step 208). If new files have arrived, the system transfers them to the appropriate hard drive of the player PC and clears the directories on the LAN server (step 214). If an audio or video playback is complete (step 210), the system reads the respective script file to determine the appropriate sub-file and next filename to be played (step 216). If the sub-file type is not a "Program" (step 218) the system determines if the primary drive is in use (step 220). If not, the system plays the file from the primary hard drive (step 222). If the primary drive is in use, the systems plays the file from the secondary drive (step 224). If the sub-file type is a "Program" (step 218) the system determines if the "Temp" file is empty (step 226). If it is empty, the system determines if the designated hard drive is available (step 228). If it is available, the system plays the selected filename (step 232). If the designated drive is not available, the selected filename is added to the "Temp" file (step 230) and the next filename is reviewed for its designated drive availability (step 228). This loop continues until a filename with an available designated hard drive can be played. Since the filenames are distributed evenly among the three hard drives it will find an available drive two-thirds of the time on the first pass. If the "Temp" file is not empty (step 226), the system selects the first filename in the "Temp" file and determines if the designated hard drive is available (step 236). If it is not available the system determines if it is the last filename in the "Temp" file (step 238). If it is the last filename, the system selects the next filename in the "Program" sub-file (step 242). The systems reviews this filename for drive availability (step 228). If it is not the last filename in the "Temp" file, the system selects the next filename in the "Temp" file and determines if the designated hard drive is available (step 236). This loop continues until a filename with an available designated hard drive can be played or all the filenames in the "Temp" file have been reviewed. If the drive is available for the selected filename in the "Temp" file (step 236), the filename is deleted from the "Temp" file (step 244) and the system plays the file. The system then returns to the monitoring mode (step 208).

Figure 5:
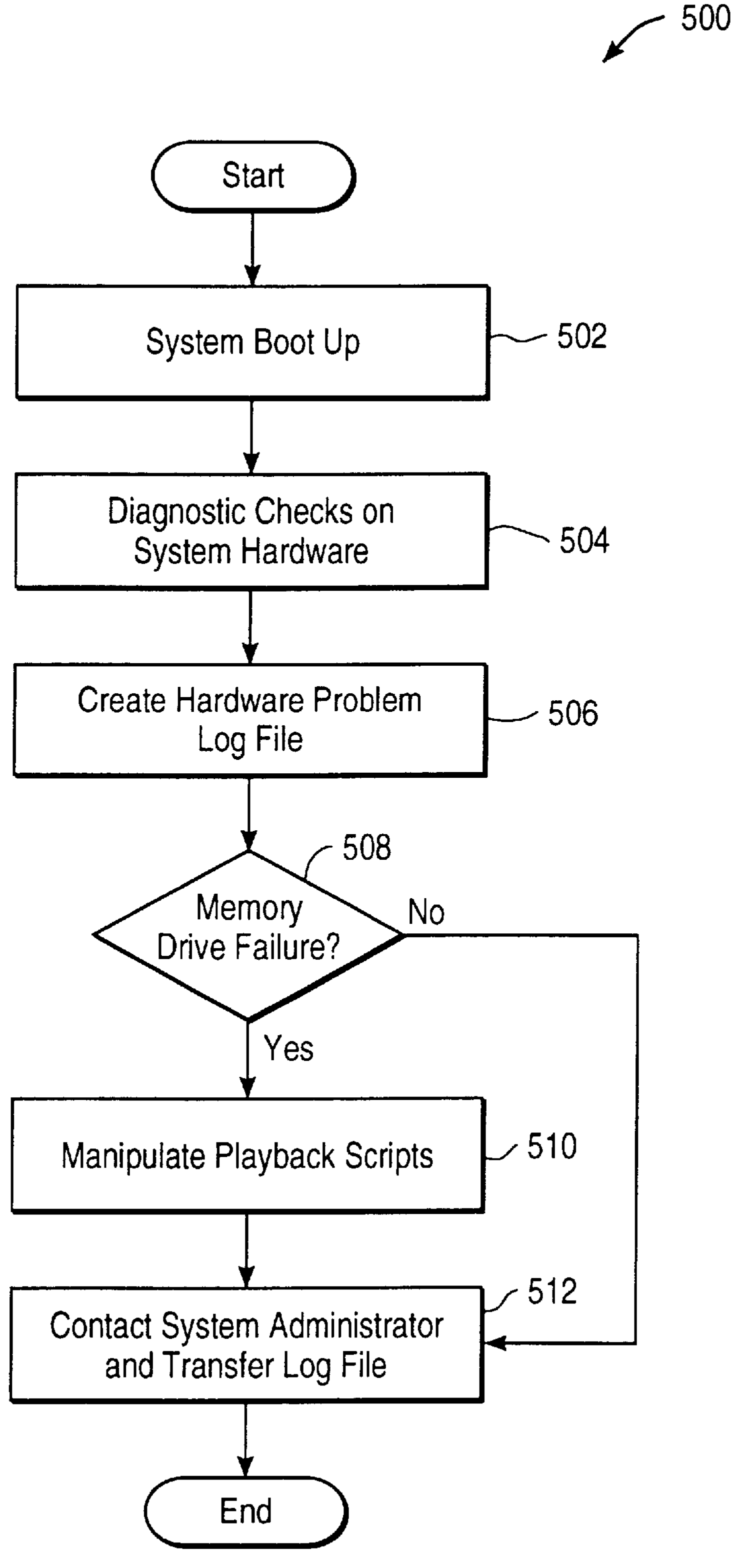
FIG. 5 is a flowchart which describes the operation of the system's self-diagnostic software module.

FIG. 5 is a flowchart 500 which describes the operation of the system's self-diagnostic software module. After boot up (step 502), the system runs a series of diagnostic checks on the system hardware (step 504). These may include but are not limited to standard MS-DOS supplied diagnostics such as "chkdsk" and "scandisk". Other commercially available diagnostics such as First Aid® by CyberMedia may also be used. When a hardware problem is found, a log file is created in which each such problem is documented (step 506). If one of the hard drives is degrading or has become inoperable (step 508), the system temporarily adjusts the manner in which the playback scripts, i.e., the audio and video presentations, are stored to work around the problem (step 510). For example, if one of three hard drives fails, the scripts known to be stored on the failed drive may be temporarily written to one or both of the remaining drives. Alternatively, the scripts known to be stored on the failed drive may be flagged in the playback sequence such that the system eliminates those scripts from the sequence. According to one embodiment, the system dials up the specified system administrator and transfers the log file detailing the system hardware problems (step 512).

While the invention has been particularly shown and described with reference to specific embodiments thereof, it will be understood by those skilled in the art that the foregoing and other changes in the form and details may be made therein without departing from the spirit or scope of the invention. For example, the embodiments of the invention have been described with reference to a system for simultaneously providing audio and video in a retail environment. It will be understood, however, that the simultaneous presentation of two or more data streams using a single hardware platform is a technique which may be employed in a wide variety of environments using any of a number of hardware platforms. Moreover, the data files employed by the present invention need not necessarily comprise audio and video data. That is, the technique by which the present invention transmits a sequence of data files may be applied to a variety of data processing contexts. The scope of the invention should therefore be determined by reference to the appended claims.

What is claimed is:

1. A method for transmitting a predetermined sequence of data files on a data bus, the data files being stored on a plurality of memory drives, the method comprising the steps of:

upon encountering a first data file of a first type in the predetermined sequence, determining whether a temporary data file may contain additional data and then determnining whether one of the plurality of memory drives is available;

where the corresponding memory drive is not available, writing first data corresponding to the first data file to a temporary data file;

transmitting the first data file on the data bus after the corresponding memory drive becomes available; and upon encountering a second data file of a second type in the predetermined sequence, transmitting the second data file on the data bus.

2. The method of claim 1 wherein each data file of the second type corresponds to a first copy stored on a primary drive and a second copy stored on a secondary drive, the third transmitting step comprising the steps of:

upon encountering the second data file in the predetermined sequence, determining whether the corresponding primary drive is available;

where the corresponding primary drive is available, transmitting the first copy corresponding to the second data file on the data bus; and where the corresponding primary drive is not available, transmitting the second copy corresponding to the second data file on the data bus.

3. The method of claim 1 wherein the second transmitting step comprises the step of:

where the first data are in the temporary data file, determining whether the memory drive corresponding to the first data file is available.

4. The method of claim 1 further comprising the steps of:

determining whether new data files have been stored in a directory;

transferring any new data files from the directory to the plurality of memory drives; and clearing the directory.

5. The method of claim 1 further comprising the step of deleting the first data from the temporary directory when the corresponding first data file is transmitted on the data bus.

6. The method of claim 1 wherein the data files comprise audio data files and video data files and the data bus is coupled to audio circuitry and video circuitry, the method further comprising the step of:

transmitting video data from the video data files to the video circuitry;

transmitting audio data from the audio data files to the audio circuitry;

driving a first audio speaker with the audio circuitry according zo the audio data thereby presenting audio presentations corresponding to the audio data files over the first audio speaker; and substantially simultaneous with the first driving step, driving a television monitor with the video circuitry according to the video data thereby presenting video presentations corresponding to the video data files on the television monitor.

7. The method of claim 6 wherein the second driving step comprises driving a second audio speaker with the video card according to the video data thereby presenting audio corresponding to the video presentations over the second audio speaker.

8. The method of claim 6 wherein the audio data are transmitted at a first data rate and the video data are transmitted at a second data rate, and wherein the first and second data rates are controlled by a single processor to ensure that substantially all of the video and audio data are employed.

9. An apparatus for transmitting a predetermined sequence of data files on a data bus, the data files being stored on a plurality of memory drives, the apparatus comprising:

means for determining whether a temporary data file may contain additional data and then determining whether one of the plurality of memory drives is available, upon encountering a first data file in the predetermined sequence;

means for transmitting the first data file on the data bus where the corresponding memory drive is available;

means for writing first data corresponding to the first data file to the temporary data file where the corresponding memory drive is not available;

means transmitting the first data file on the data bus after the corresponding memory drive becomes available; and means for transmitting a second data file of a second type on the data bus upon encountering the second data file in the predetermined sequence.

10. An apparatus for transmitting a predetermined sequence of data files, comprising:

a plurality of memory drives having the data files stored thereon, a data bus for transmitting the data files;

a memory having a plurality of addresses therein, defining a temporary data file;

circuitry which employs data in the data files; and a processor which is operable to:

upon encountering a first data file of a first type in the predetermined sequence, determine whether the temporary data file may contain additional data and then determining whether one of the plurality of memory drives is available;

where the corresponding memory drive is available, transmit the first data file to the circuitry via the data bus;

where the corresponding memory drive is not available, write first data corresponding to the first data file to the temporary data file;

transmit the first data file to the circuitry via the data bus after the corresponding memory drive becomes available; and upon encountering a second data file of a second type in the predetermined sequence, transmit the second data file to the circuitry via the data bus.

11. The apparatus of claim 10 wherein the plurality of memory drives comprises three hard drives.

12. The apparatus of claim 10 wherein the data files comprise audio and video data files and the circuitry comprises an audio card and a video card, the apparatus further comprising a first audio speaker which is coupled to and driven by the audio card, and a television monitor which is coupled to and driven by the video card.

13. The apparatus of claim 12 further comprising a second audio speaker coupled to and driven by the video card.

14. The apparatus of claim 10 further comprising a network interface coupled to the data bus, and a file server coupled to the network interface, the file server having a dedicated directory corresponding to the network interface.

15. A computer program product for transmitting a predetermined sequence of data files on a data bus, the data files being stored on a plurality of memory drives, comprising:

computer-readable medium; and a computer program mechanism embedded in the computer-readable medium for causing a computer to perform the steps of:

upon encountering a first data file of a first type in the predetermined sequence, determine whether the temporary data file may contain additional data and then determining whether one of the plurality of memory drives is available;

where the corresponding memory drive is available, transmitting the first data file on the data bus;

where the corresponding memory drive is not available, writing first data corresponding to the first data file to a temporary data file;

transmitting the first data file on the data bus after the corresponding memory drive becomes available; and upon encountering a second data file of a second type in the predetermined sequence, transmitting the second data file on the data bus.

16. The method of claim 1 further including providing audio circuitry including a speaker to produce auditory stimuli and video circuitry including a monitor to produce visual stimuli wherein said a first subset of said data files includes audio information and a second subset of said files includes video information, with data files containing video information having a first data transmission rate associated therewith and files containing audio information having a second data transmission rate associated therewith, with said data files being transmitted on said data bus at a rate corresponding to a slower of said first and second data transmission rates.

17. The method of claim 16 further comprising providing a second audio speaker and connected said second audio speaker to be driven by the video circuitry.

18. The method of claim 17 further comprising providing independent control for a first sound level associated with the second audio speaker and a second sound level associated with the monitor.

19. The method of claim 16 wherein the first data rate is maintained below a data rate limit to facilitate a first level of quality of the audio presentations.

20. The apparatus of claim 10 wherein a first sub-part of said data files contain video information and a second sub-part of said data files include audio information and said circuitry includes video circuitry in data communication with the plurality of memory drives to receive the video information at a first data rate, audio circuitry in data communication with the plurality of memory drives to audio information at a second data rate, a first audio speaker coupled to and driven by the audio circuitry and a monitor coupled to and driven by the video circuitry.

21. The apparatus of claim 20 further comprising a second audio speaker coupled to and driven by the video circuitry.

22. The apparatus of claim 1 wherein the plurality of memory drives comprises three hard drives.

23. A method, comprising:

storing a plurality of computer-readable files on multiple disk drives, with a sub-group of said files containing information;

sequentially calling a subset of said sub-group, in accordance with a predefined sequence, to provide a presentation of said information associated therewith, defining a presentation sequence, with each file in said predefined sequence having a position therein in relation to the remaining files of said subset; and dynamically arranging information, corresponding to said subset, in said presentation sequence, with information corresponding to files contained on one of said multiple disk drives that is inaccessible during sequentially calling of said subset, defining inaccessible files, having a position in said presentation sequence in relation to the information corresponding remaining files of said subset that differs from said position of said inaccessible files in said predefined sequence.

24. The method as recited in claim 23 further including providing a data bus and a memory having a plurality of addresses corresponding to a temporary file wherein dynamically arranging information includes determining whether said temporary is in one of two states before calling files of said subset.

25. The method as recited in claim 23 further including providing a data bus and a memory having a plurality of addresses corresponding to a temporary file wherein dynamically arranging information includes writing a file name to said temporary file corresponding to one of said files in said subset being called and contained on one of said plurality of disk drives that is inaccessible.

26. The method as recited in claim 23 further including providing a data bus and a memory having a plurality of addresses corresponding to a temporary file, with said temporary file containing file-name information wherein dynamically arranging information includes determining whether said temporary may contain additional information and reading from one of said plurality of disk drives, information corresponding to said file associated with said file-name upon determine said temporary file can contain no additional information.

27. The method as recited in claim 23 wherein said presentation sequence includes auditory stimuli.

28. The method as recited in claim 23 wherein said presentation sequence includes visual stimuli.

* * * * *